April 27, 1937.    H. E. HOLLMANN    2,078,245
MODULATION AND FREQUENCY STABILIZATION
Filed June 16, 1934
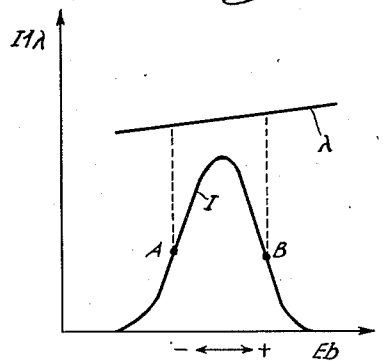
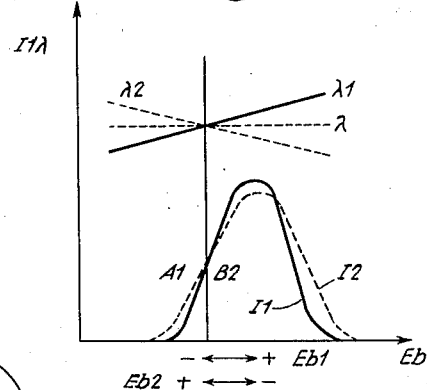
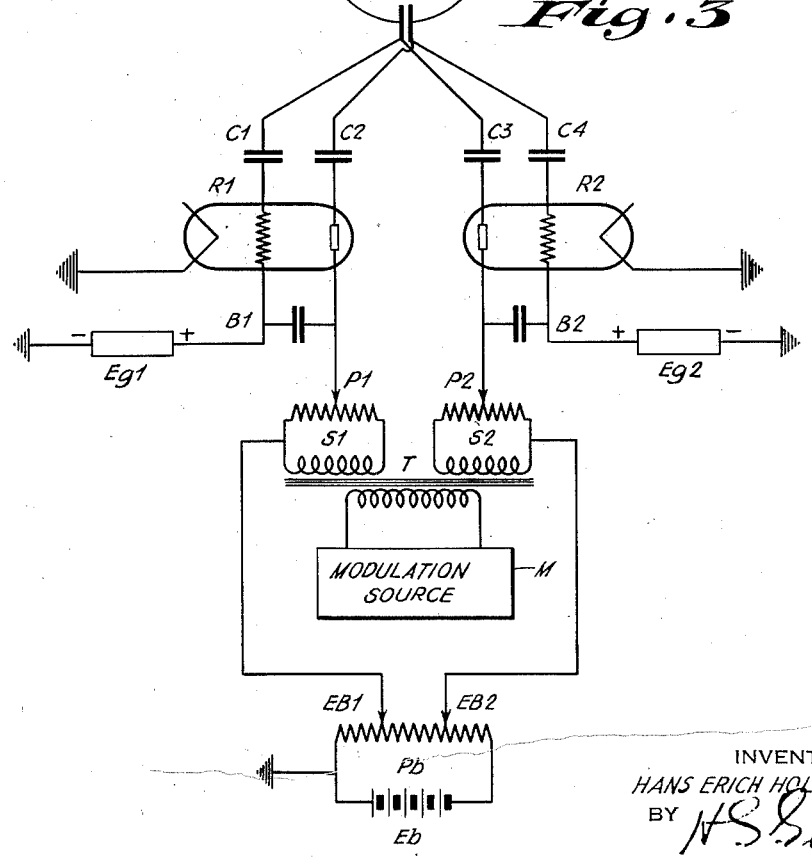
INVENTOR
HANS ERICH HOLLMANN
BY
ATTORNEY Patented Apr. 27, 1937

2,078,245

UNITED STATES PATENT OFFICE 2,078,245

MODULATION AND FREQUENCY STABILIZATION

Hans Erich Hollmann, Berlin, Germany, assignor to Telefunken Gesellschaft für Drahtlose Telegraphie m. b. H., Berlin, Germany, a corporation of Germany Application June 16, 1934, Serial No. 730,855
In Germany June 19, 1933

5 Claims. (Cl. 179—171)

This invention relates to a method of amplitude modulation of ultra short wave transmitters with frequency stabilization.

The novel features of my invention have been pointed out at the end of the specification.

The nature of my invention and the manner of operation of the same will be understood from the following detailed description thereof and therefrom when read in connection with the attached drawing, in which;

Figures 1 and 2 are graphs illustrating my invention, while;

Figure 3 is a circuit including features of my invention.

The modulation of an "electron generator", i. e., a thermionic tube oscillator preferably working in what has been called a retarding field circuit scheme designed for extremely short electric waves, in which generation of waves is caused by the migration or oscillation of electrons in the tube or is governed by so-called "ultra-dynamic characteristics", or internal resistances, is effected, as well known to the expert, most simply by a control of the electrode potentials, and in that case the retarding-field electrode of a transmitter tube of this kind distinguishes itself by particularly high sensitiveness. This modulation method, to be sure, involves the drawback that the amplitude modulation of necessity is tied up with a frequency modulation which resides in and is due to the reaction upon the resonant system produced by the tube which may be conceived as being a complex resistance variable with the potentials, and this is a very disturbing feature in practical operation especially in the reception of highly de-attenuated (regenerative) receivers possessing great selectance.

In order to obviate this difficulty and to insure pure amplitude modulation under constant frequency conditions with such an "electron generator", recourse is had in the present invention to the phenomenon and fact that the voltage tuning, i. e., the relationship between the retarding-field voltage and the oscillation energy exhibits a marked resonance characteristic, whereas the simultaneous frequency characteristic, i. e., the relationship between the retarding-field voltage and the wave-length of the ensuing oscillations rises steadily or drops steadily. This condition shall be explained more clearly by reference to Figure 1 where the lower graph is the voltage resonance curve of a retarding-field generator showing the oscillation energy I as a function of the potential $Eb$ of the retarding-field electrode, while the upper graph represents the shape of the wave-length as a function of the potential $Eb$. It will be obvious that amplitude modulation by alternating potentials impressed upon the retarding-field is feasible upon both sides or slopes of the amplitude resonance curve, i. e., at the working points marked A and B; the frequency characteristic shows in both working points the same tendency inasmuch as the wave-length grows steadily with a positively growing potential of the retarding-field electrode.

Now, according to this invention compensation of the frequency shift occurring upon modulation is accomplished by using two generator tubes or generator units which, in a way well known in the earlier art and for the purpose of increased power, by the adoption of various forms of construction of circuit arrangements, are made to work upon a joint resonance circuit and are operated upon different branches or sides of their voltage resonance curves. For example, one of the tubes may work upon point A and the other one on point B; if, then, the modulation potentials are impressed upon both tubes under conditions of phase opposition (push-pull principle), the amplitude control action or modulation for both tubes will occur in the same sense, whereas frequency modulation in both tube units is opposite so that, with suitable adjustment, it will be compensated to zero.

By reference to the key diagram Figure 3 and the graphic representation Figure 2, the process of frequency stable amplitude modulation of two retarding-field sets working in detail in parallel shall be explained in more detail according to this invention.

Referring to Figure 3, R1 and R2 denote oscillator tubes arranged respectively along two parallel wire systems and which work upon the joint resonance circuit CL. They are separated therefrom for direct current by blocking capacities C1—C4, while electrode potentials are impressed thereon from the free ends of the parallel wire system. The voltage lines are tuned by means of the bridges B1 and B2. The biasing potentials for the retarding-field electrode $Eb1$ and $Eb2$ are obtained at a voltage divider $Pb$ and the value thereof is capable of being varied so that different working points may be set for both tubes. The modulation transformer T comprises two secondary windings S1 and S2 whose voltages are fed to the two retarding-field electrodes in phase opposition. In order to be able to adjust the same percentage of modulation in both tubes, the two modulation voltages are suitably collected also at voltage dividers P1 and P2; in this manner, any possibly existing lack of symmetry in the voltage resonance curve, i. e., dissimilar slopes of the two sides of the curve, can be equalized.

The manner in which the modulation circuit scheme disclosed by the present invention works will be illustrated more clearly by reference to Figure 2, where I1, I2, represents the voltage resonance curves of the two tubes. For purposes of illustration and to superpose the curves in such a manner as to obtain a common static operating point for both tubes, one of the resonance curves, say I2, has been reversed with respect to the other. This reversing of the resonance curve may be obtained by using oppositely directed abscissa scale such that the two working points A1 and B2 coincide, a condition that may be secured, if necessary, by different grid voltages, $Eg$. However, inasmuch as the modulation voltages of the transformer T supplied in the working points A1 and B2 are in phase opposition, the separate voltage resonance curves Figure 2, starting from the working points are passed in the same sense upwards and downwards; and this means that the amplitude modulation for both tubes occurs in phase.

Plotting in the diagram also the wave or frequency characteristic, this fact should be borne in mind that since the two tubes have a joint resonance circuit, also the static working point must be common to both. The wave characteristics $\lambda 1$, $\lambda 2$, which hold for each tube, as has been pointed out above, show a rising tendency with rise of retarding-field electrode potential $Eb$, and they are of contrary direction on the abscissa axis with due regard to the voltage scales $Eb1$ and $Eb2$. However, since the modulation in the diagram takes place in one direction, it will be noted that the frequency tendencies in both tubes must neutralize each other; in other words, that the wave-length corresponding to and prevailing at the working point must remain stable as indicated by the straight horizontal dotted line.

In studying the operation of the circuit scheme, it must be kept in mind that the tuning of the oscillation circuit LC influences the frequency of the oscillations produced. The internal resistances and the electrode capacity of the tubes R1 and R2 constitute part of the resonance system so that under certain circumstances the capacity C may be dispensed with. For the operating point which is determined by the intersection of the graphs I1 and I2, the whole resonant system should be tuned to the desired wave ($\lambda$). If the two tubes are modulated in opposition, one of the tubes, say R1, has a tendency to produce a longer wave than the tube R2, because the effective electrode voltage on this tube has increased, whereas the voltage on the tube R2 has decreased. At the same time, R2 tends to generate a shorter wave. The electron tubes may be imagined to comprise a complex resistance whose real and imaginary parts change with the time of transit of the electrons or the voltage governing the latter, the oscillation intensity being here determined by the real part, and the frequency by the imaginary part. The action of the tube impedance will be inductive or capacitive, depending on which side of its resonance curve crest it is operating. In the present instance, the real resistances become added to each other, and thus the powers generated by both tubes are added, while the imaginary components become compensated in that the inductive reactance component of one tube is offset by the capacitive reactance component of the other tube. Due to the modulation in opposition, the capacitive component of one tube is changed in the same measure as the inductive component in the other tube. Therefore, the entire resonant system stays ohmic and oscillations of constant wave length are produced and amplitude modulated.

It will be understood that nothing is altered in the basic idea of the invention and its application if the two transmitter sets comprise a plurality of tubes paralleled in any desired manner at the radio frequency end instead of consisting of just one tube.

Having thus described my invention and the operation thereof, what I claim is:

1. The method of producing amplitude modulation by means of a pair of oscillation producing tubes having electrodes connected with a resonant circuit and having like electrodes subjected to modulating potentials in phase opposition, and of preventing said modulating potentials from effecting frequency modulation of the oscillations produced, which includes the steps of, operating said tubes on opposite sides of the voltage resonance characteristic curve of said circuit and tubes, and adjusting the amplitude of the potential on the electrodes thereof so that the tendency of the modulating potentials on one tube electrode to change the tune of said circuit is balanced by the effect of the modulating potentials on the like electrode of the other tube.

2. In a signalling system, an oscillation generator of the Barkhausen type comprising a pair of electron discharge tubes, each tube having anode and control grid electrodes connected by a circuit which with said tubes is resonant to the frequency of the oscillations to be generated, sources of potential connected with the electrodes of said tubes, a source of modulating potentials coupled in phase opposition to like electrodes in said tubes for modulating the amplitude of the oscillations generated in said tubes, and means for insuring that changes in reactance of said tubes and circuits caused by said modulating potentials on one of said electrodes is compensated by opposite and like variations in said modulating potentials on the other of said electrodes, whereby the frequency of the oscillations generated in said tubes and circuit remain substantially constant, comprising means for relatively adjusting the direct current potentials applied to the anodes of said tubes to a point at which said tubes each operate on opposite sides of their combined voltage resonance characteristic curves.

3. In a constant frequency wave generating and amplitude modulating system a pair of electron discharge tubes each having a cathode, an anode and a grid electrode, a resonant circuit having a common portion connected between the grid and anode of each of said tubes, means for maintaining the grid of each of said tubes positive with respect to the cathode of each tube, whereby oscillations are produced in said tubes and circuit, a source of modulating potentials connected in phase opposition between the anodes of said tubes, and variable means for applying different direct current potentials to the anodes of said tubes such that the tubes operate on different sides of the voltage resonant characteristic of said tubes and circuits.

4. In a signalling system including a pair of vacuum tube generators and an external resonant circuit connected with electrodes of said tubes wherein the frequency of the oscillations generated varies substantially linearly with variation of potential of an electrode of either of said tubes over a considerable potential range of variation of said potential, and wherein the amplitude of the oscillations generated is maximum for a particular value of said electrode potential, the method of modulating the amplitude of the oscillations generated by said system without appreciably varying the frequency thereof, which consists in, biasing the said electrode of one tube to a potential of a value less than said particular value and preferably to a value where the rate of change of amplitude of oscillation with respect to variation of said electrode potential is maximum, biasing the corresponding electrode of the other tube to a potential of a value greater than said particular value, and preferably to a value where rate of change of amplitude of oscillation with respect to variation of said electrode potential is maximum, and superimposing oppositely phased signal voltages of substantially equal magnitudes upon said electrodes, whereby the effects of said voltage upon the frequency of the generated oscillations substantially neutralize but the effects upon the amplitude of said oscillations are cumulative.

5. The method of modulating the amplitude of oscillations produced in two Barkhausen oscillator tubes having their anodes and control grids connected in oscillation producing circuits, a portion of which is common to both oscillators without frequency modulating the oscillations which includes the steps of, biasing the electrodes of said oscillators to such potentials that one of said tubes operates on one side of their combined voltage resonant characteristics and the other of said oscillators operates on the other side of said characteristic, whereby increases in potential on each of said tubes results in cumulative changes in the amplitude of oscillations in said output circuit, and opposite changes in the frequency of the oscillations in said output circuit, and modulating the potentials applied to said electrodes in phase opposition at signal frequency.

HANS ERICH HOLLMANN.